US008285203B2

(12) United States Patent
Avellan et al.

(10) Patent No.: US 8,285,203 B2
(45) Date of Patent: *Oct. 9, 2012

(54) SYSTEM AND METHOD FOR ENABLING ULTRA SMALL APERTURE COMMUNICATION ANTENNA USING SPECTRAL REPLICATION AND COHERENT FREQUENCY AND PHASE COMBINING

(75) Inventors: Abel Avellan, Miami, FL (US); Sriram Jayasimha, Hyderabad (IN)

(73) Assignee: EMC SatCom Technologies, LLC, Miami, FL (US)

( * ) Notice: Subject to any disclaimer, the term of this patent is extended or adjusted under 35 U.S.C. 154(b) by 449 days.

This patent is subject to a terminal disclaimer.

(21) Appl. No.: 12/549,066

(22) Filed: Aug. 27, 2009

(65) Prior Publication Data
US 2011/0028086 A1 Feb. 3, 2011

Related U.S. Application Data

(60) Provisional application No. 61/230,888, filed on Aug. 3, 2009.

(51) Int. Cl.
*H04B 7/185* (2006.01)
(52) U.S. Cl. ...... 455/13.3; 455/12.1; 455/427; 455/3.01
(58) Field of Classification Search .................. 455/12.1, 455/427, 3.02, 456.5, 428, 3.03, 425, 424, 455/561, 115.1, 13.2, 13.3, 3.01, 430, 452.1, 455/452.2, 67.11, 67.13, 272, 101, 13.4, 455/132, 140, 277.2; 370/316, 318, 347, 370/320, 335, 342, 401; 375/148, 150, 147, 375/267, 347; 725/81, 68, 71, 78
See application file for complete search history.

(56) References Cited

U.S. PATENT DOCUMENTS

| 4,539,565 | A |   | 9/1985  | Norsworthy |
| 5,233,626 | A |   | 8/1993  | Ames |
| 5,454,009 | A |   | 9/1995  | Fruit et al. |
| 5,684,793 | A | * | 11/1997 | Kiema et al. ............... 370/335 |
| 5,812,538 | A | * | 9/1998  | Wiedeman et al. .......... 370/316 |
| 5,844,951 | A | * | 12/1998 | Proakis et al. ............... 375/347 |
| 5,859,874 | A |   | 1/1999  | Wiedeman et al. |
| 5,920,626 | A | * | 7/1999  | Durden et al. ............... 380/210 |

(Continued)

OTHER PUBLICATIONS

S. Jayasimha and P. Jyothendar, Reducing VSAT Aperture Via Satellite MIMO, Military Communications Conference, 2008, MILCOM 2008, IEEE, pp. 1-6.

(Continued)

Primary Examiner — Tan Trinh
(74) Attorney, Agent, or Firm — Blank Rome LLP

(57) ABSTRACT

A satellite communications system has a hub terminal which communicates with a remote terminal through a satellite. The hub terminal 100 includes a transmitting modulator, power booster, up-converter and Power Amplifier (PA), and a transmitting station. The transmitting modulator generates a modulated signal, which is output to the power booster. The power booster receives the modulated signal and generates a spectral replication of the signal. The signal is then up-converted and amplified, and transmitted as an uplink signal to the satellite via a transmitting antenna. A remote station antenna receives the corresponding downlink signal. Following LNB/LNA and down-conversion, the signal is passed to a diversity combiner. The diversity combiner aligns the replicated signals by frequency and phase and generates a power-boosted signal. Accordingly, the system enables the use of ultra small antennas by providing increased power.

10 Claims, 8 Drawing Sheets

U.S. PATENT DOCUMENTS

| | | | |
|---|---|---|---|
| 5,987,037 A | 11/1999 | Gans | |
| 6,088,351 A | 7/2000 | Jenkin et al. | |
| 6,147,981 A * | 11/2000 | Prescott | 370/318 |
| 6,154,501 A | 11/2000 | Friedman | |
| 6,157,812 A * | 12/2000 | Sarraf | 455/13.4 |
| 6,442,193 B1 * | 8/2002 | Hirsch | 375/147 |
| 6,445,747 B1 | 9/2002 | Jafarkhani et al. | |
| 6,452,989 B1 | 9/2002 | Friedman | |
| 6,549,582 B1 | 4/2003 | Friedman | |
| 6,724,827 B1 | 4/2004 | Patsiokas et al. | |
| 6,738,434 B2 | 5/2004 | Friedman | |
| 6,775,251 B1 * | 8/2004 | Wiedeman et al. | 370/316 |
| 6,836,658 B1 | 12/2004 | Sharon et al. | |
| 6,865,238 B2 | 3/2005 | Friedman | |
| 7,039,119 B2 | 5/2006 | Friedman | |
| 7,231,178 B2 | 6/2007 | Friedman et al. | |
| 7,336,679 B2 | 2/2008 | Dillon | |
| 7,522,877 B1 | 4/2009 | Avellan et al. | |
| 7,907,894 B2 * | 3/2011 | Avellan et al. | 455/13.3 |
| 7,954,127 B2 * | 5/2011 | James et al. | 725/81 |
| 2003/0031265 A1 | 2/2003 | Friedman | |
| 2003/0092379 A1 * | 5/2003 | Brothers et al. | 455/12.1 |
| 2004/0142665 A1 * | 7/2004 | Papathanasion et al. | 455/101 |
| 2004/0146094 A1 * | 7/2004 | Kong et al. | 375/148 |
| 2004/0242173 A1 * | 12/2004 | Takeda | 455/132 |
| 2006/0126750 A1 * | 6/2006 | Friedman | 375/260 |
| 2006/0291599 A1 * | 12/2006 | Strodtbeck et al. | 375/347 |
| 2007/0002961 A1 * | 1/2007 | Hoctor et al. | 375/267 |
| 2007/0142009 A1 | 6/2007 | Scarpa et al. | |
| 2008/0146182 A1 * | 6/2008 | Lin et al. | 455/277.2 |
| 2008/0174470 A1 * | 7/2008 | Lum et al. | 342/16 |
| 2008/0214107 A1 | 9/2008 | Dankberg et al. | |
| 2008/0232240 A1 | 9/2008 | Baum et al. | |
| 2008/0311858 A1 | 12/2008 | Cheng et al. | |
| 2009/0180564 A1 | 7/2009 | Celebi et al. | |
| 2010/0040178 A1 * | 2/2010 | Sutton et al. | 375/345 |
| 2011/0028088 A1 * | 2/2011 | Avellan et al. | 455/13.2 |

OTHER PUBLICATIONS

Shoichi Narahashi and Toshio Nojima, "*A New Phasing Scheme for Multitone Signal Systems to Reduce Peak-to-Average Power Ratio*", Electronics and Commuications in Japan, Part 1, vol. 80, No. 1, 1997, pp. 89-99, Translated from Denshi Joho Tsushin Gakkai Ronbunshi, vol. 78-B-II, Nov. 1995, pp. 663-671.

S. Harahashi, K. Kumagai and T. Nojima, "*Minimising peak-to-average power ratio of multitone signals using steepest descent method*", Electronics Letters 31$^{st}$ Aug. 1995, vol. 31, No. 18, pp. 1552-1554.

QEST White Paper "ULNAs and ASI", Sep. 1, 2008, "*How ultra-low-noise amplifiers may help to solve adjacent satellite interference problems for very small apertures*", pp. 1-4.

Gagan L. Choudhury and Stephen S. Rappaport, "*Diversity ALOHA-A Random Access Scheme for Satellite Communications*"IEEE Transactions on Communications, vol. Com-31, No. 3, Mar. 1983, pp. 450-457 with Abstract.

European Search Report with Written Opinion for co-pending application EP 10165565 dated Apr. 20, 2011.

* cited by examiner

SYSTEM AND METHOD FOR ENABLING ULTRA SMALL APERTURE COMMUNICATION ANTENNA USING SPECTRAL REPLICATION AND COHERENT FREQUENCY AND PHASE COMBINING

RELATED APPLICATIONS

The present application claims priority to provisional application No. 61/230,888, filed Aug. 14, 2009, the contents of which are hereby incorporated by reference in its entirety.

BACKGROUND OF THE INVENTION

1. Field of the Invention

The present invention relates to a satellite communication system and method for enabling ultra small aperture receivers by transmitting multiple spectral replicas to ultra small aperture receivers that coherently combine in frequency and phase of the desired signals of the multiple spectral replicas. More particularly, the present invention enables ultra small aperture communications systems by boosting power density (by replication) to the receiving antenna enabling ultra small aperture antennas in frequency bands like C band and Ku band.

2. Background of the Related Art

Satellite communications systems typically comprise an earth station (called a "hub") and multiple geographically disperse smaller receiving antennas. Signals from the hub are transmitted on an uplink signal to the satellite, and retransmitted from the satellite to various smaller remote stations. The remote stations typically have a Very Small Aperture Terminal (VSAT) antenna. The antennas acquire the downlink signal from a particular satellite as that satellite passes through the field of view for that antenna.

As the aperture of the remote station antennas reduces, the G/T (antenna Gain/system noise Temperature) of the antenna degrades. This, in turn reduces the effective difference between the desired signal and thermal noise and interference (C/(N+I)). As the antenna get smaller, the satellite's available power expended in the desired signal does not overcome the thermal noise and interference; thus usage of an ultra small aperture antenna is impractical.

In addition, as the aperture size decreases, the size of the beam gets wider. As the beam size increases, the field of view increases and the antenna is more likely to encounter more signals from multiple satellites that use the same frequency band (satellites are spaced as close as 2.5 degrees). As a result, VSAT antennas (with aperture sizes in the range of about 1.8-4.5 meters for C band and 9 cm-2.4 meters for Ku band) are susceptible to encountering Adjacent Satellite Interference (ASI). Such undesired signals interfere with the reception of the desired signal.

In practice, it is not feasible to utilize low-cost ultra small aperture terminal antennas (as small as about 80 cm for C band and 20 cm for Ku band). This is due to negative effects of low aperture resulting in an increase in ASI interference and a low G/T.

In addition, satellites have limited power and consequently have limited amounts of power which can be used to communicate uplink and downlink signals. Increasing power available on a satellite (its EIRP) can be very expensive. Moreover, if all (neighboring) satellites increased EIRP (Equivalent Isotropically Radiated Power), the relative level of ASI (associated with using a small aperture antenna) would not reduce. However, the performance of a satellite communication link is proportional to the satellite power allocated to it. As link power increases (at additional cost), so does the link performance.

Thus, it is important to identify a controlled means of improving satellite communications systems, in particular (but not limited) to FSS satellites operating in lower frequency bands with 2 to 3 degrees of spacing between the satellites to allow the use of low-cost ultra small aperture terminals (for example, in improving the quality and reducing cost of DTH, i.e., Direct To Home, services).

SUMMARY OF THE INVENTION

Accordingly, it is an object of the invention to enable ultra small antennas to be used for satellite communications. It is a further object of the invention to increase the power provided to signals transmitted over satellite.

Accordingly, a satellite communications system includes a hub terminal which communicates with a remote terminal through a satellite. The hub terminal 100 includes a transmitting modulator, power booster, up-converter and Power Amplifier (PA), and a transmitting station. The transmitting modulator generates a modulated signal, which is output to the power booster. The power booster receives the modulated signal and generates a spectral replication of the signal. The signal is then up-converted and amplified, and transmitted as an uplink signal to the satellite via a transmitting antenna. A remote station antenna receives the corresponding downlink signal. Following LNB/LNA and down-conversion, the signal is passed to a receive diversity combiner. The diversity combiner aligns the replicated signals by frequency and phase and generates a power-boosted signal. Accordingly, the system enables the use of ultra small antennas by providing increased power and gain.

These and other objects of the invention, as well as many of the intended advantages thereof, will become more readily apparent when reference is made to the following description, taken in conjunction with the accompanying drawings.

DETAILED DESCRIPTION OF THE PREFERRED EMBODIMENTS

Figure 1:
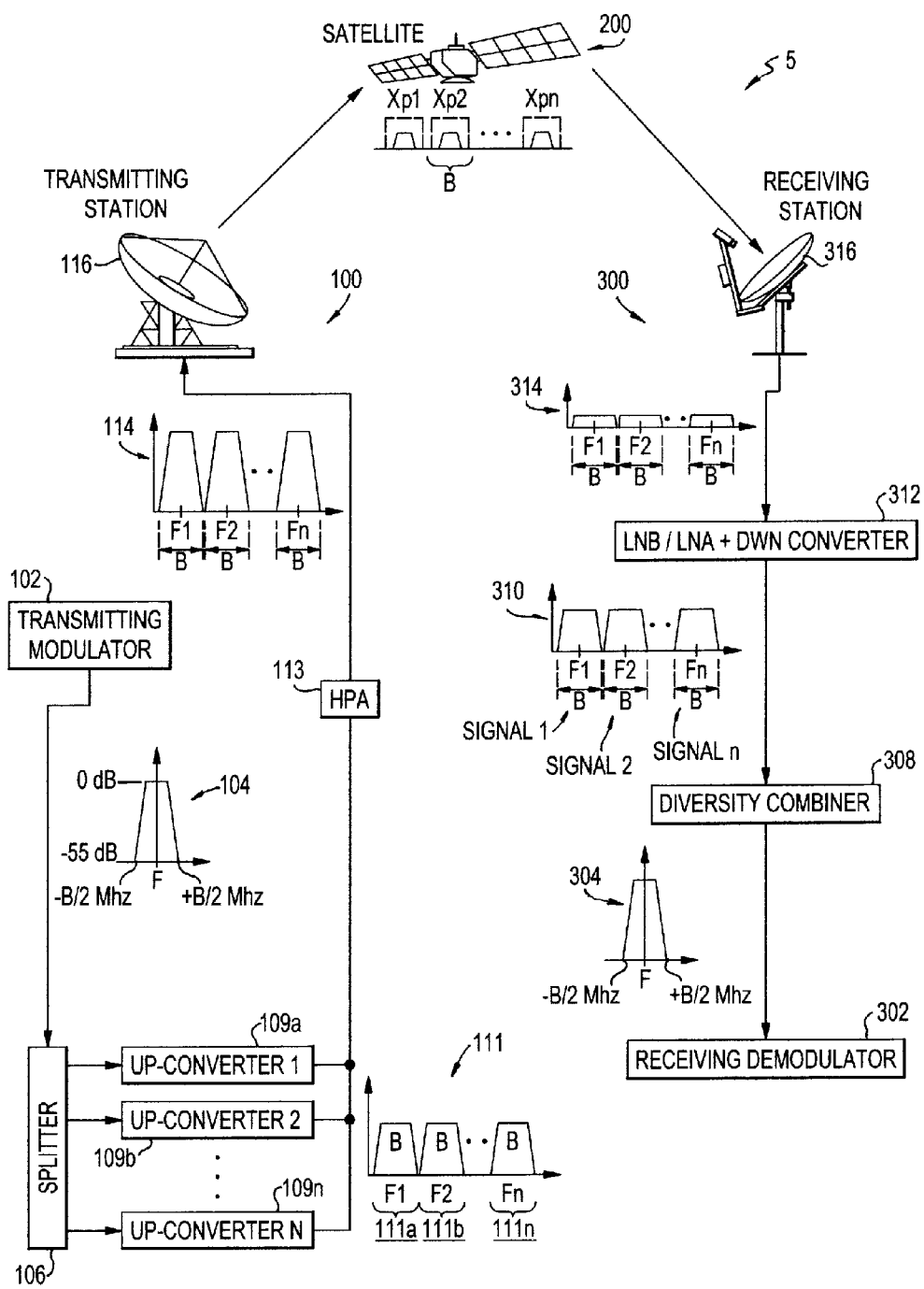
FIG. 1 is a block diagram of the satellite communications system in accordance with the preferred embodiment of the invention, using multiple satellite transponders of a single satellite.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose.

Turning to the drawing, FIG. 1 shows the overall satellite communications system 5 in accordance with the preferred embodiment of the invention. The system 5 generally includes a hub terminal 100 which communicates with a remote terminal 300 through a satellite 200. As shown, the hub terminal 100 includes a transmitting modulator 102, splitter 106, up-converters 109a, 109b . . . 109n, High Power Amplifier (HPA) 113, and a transmitting station 116. The transmitting modulator 102 generates a modulated signal 104, which is output to the splitter 106.

The multiplexer or splitter 106 separates the modulated signal 104 to multiple converters 109a, 109b . . . 109n. The converters 109a, 109b . . . 109n processes the modulated signal 104 into a combined signal 111 having multiple replicated signals 111a, 111b . . . 111n. Each of the replicated signals 111a, 111b . . . 111n contain the same information and have the same bandwidth, as the modulated signal 104, but at different frequencies F1, F2 . . . Fn. Thus, the replicated signal 111 refers to a frequency-translated version of the input signal 104. It should be understood, however, that at least one of the replicated signals 111a, 111b . . . 111n can be the actual input signal 104, which would correspond to a frequency-translation of zero. Each of the transponders of the satellite 200 have a frequency bandwidth of 36 MHz or 72 MHz. Thus, the selected frequencies F1, F2 . . . Fn of the combined signal 111 are each tuned to different transponders of the satellite 200, and each have up to the 36 MHz or 72 MHz bandwidth associated with the desired transponder. For instance, the replicated signal 111b is tuned to a frequency and within the bandwidth of transponder B of satellite 200.

The converted signal 111 is then transmitted to the HPA 113, which amplifies the signal 111 to output an amplified uplink signal 114. The amplification is performed by the HPA 113 after the up-converting 109, but can be done at the same time, as the PA does in FIG. 6. The uplink signal 114 is then transmitted by the transmitting station 116 to the satellite 200. Accordingly, the system 5 transmits the uplink signal over multiple transponders (with a single carrier on each transponder) of a single satellite.

The remote terminal 300 includes a receiving station 316, converter 312, diversity combiner 308 and demodulator 302. The receiving station 316 receives the downlink signal 314 from the transmitting station 116 via the satellite 200. The downlink signal 314 contains the same information, and has the same bandwidth as the uplink signal 114, and the replicated signals are at the same frequencies F1, F2, Fn. However, the downlink signal 314 has lower power than the uplink signal 114. The receive signal 314 is then sent to the LNB/LNA (Low-Noise Block/Low-Noise Amplifier) and down-converter 312, which generates a down-converted signal 310. The LNB converts the downlink signals to electrical signals and converts them to the L-band range, or any applicable frequency. The down-converted signal 310 is then input to the diversity combiner 308, which in turn generates a diversity combined signal 304. The diversity combined signal 304 contains the same information, and has the same bandwidth and frequencies as the downlink signal 314, but with increased power. The diversity combined signal 304 at the remote station 300 is intended to be the same as the original modulated signal 104 at the hub station 100. The diversity combined signal 304 is demodulated by the receiving demodulator 302.

Figure 2:
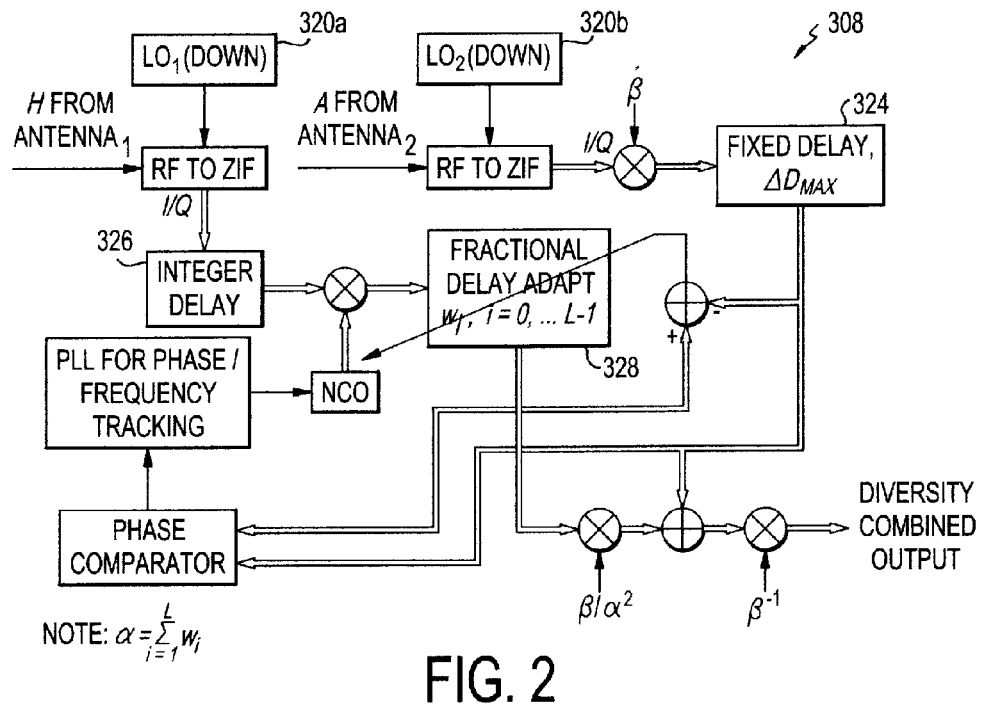
FIG. 2 is a block diagram of the diversity combiner of FIG. 1.

Turning to FIG. 2, the diversity combiner 308 is shown in greater detail. The two received signals are digitized (at a sampling rate consistent with the signal bandwidth) and down-converted to baseband by mixing each respective signal with a LO (Local Oscillator) 320a, 320b. One of the signals is multiplied by $\beta$ (this accounts for any gross differential gain at the two frequencies) and delayed by the maximum differential delay that can be encountered (this is a fixed delay). The other signal is delayed by an adaptive integer sample delay 326, which is acquired by correlating the signals with each other. In the case that the transponders are on the same satellite, the integer sample delay, corresponding to the differential path delay at the two frequencies, may be a small number (if not 0).

The output of the adaptive delay 326 is mixed with a numerically controlled oscillator before it enters a fractional sample adaptation filter 328. The difference between the output of the filter 328 and the output of the fixed delay 324, is used to drive the adaptive filter 328, via a least mean square adaptive algorithm. In addition, the product of the outputs of the adaptive filter 328 and the fixed delay 324 drive a phase-locked loop, which in turn controls the NCO (Numerically Controlled Oscillator) at the output of the integer delay 326. After a small settling time, the outputs of the adaptive filter 328 and the fixed delay 324 are aligned in time, frequency, phase, and amplitude. At this point, the outputs of the adaptive filter 328 and the fixed delay 324 can be weighted and summed (or, coherently combined, which denotes that the signals are configured to have the same delay, phase and frequency) after multiplying the output of the adaptive filter 328 by $\beta/\alpha^2$, where $$\alpha = \sum_{i=1}^{L} w_i.$$

Coherent combining of two equal amplitude signals results in a 6 dB increase in signal level (i.e., the amplitude is doubled). Further, if the two signals are immersed in identically distributed but independent noise and interference, the diversity combiner's noise, for sufficiently small fraction delay 328 adaptation step-size $\mu$, noise and interference power increases by 3 dB. The net gain in signal-to-noise ratio (for equal strength signals and noises) is thus 3 dB. The more general case of unequal signal amplitudes and unequal noise powers is discussed below. It should be noted that the diversity combiner may be implemented as a low-cost application specific integrated ASIC in large quantities and is suited for such applications as DTH. In this case, certain assumptions (e.g., the maximum differential delay) can reduce the number of gate equivalents in the ASIC.

The following example illustrates how the diversity combiner 308 maximizes the combined carrier-to-noise of the multiple replicas 310 when the replicas 310 are not of the same value as each other. In the general case, with signal-to-noise-plus-interference ratios $C_1/(N_1+I_1)$ and $C_2/(N_2+I_2)$, a simple, but sub-optimum scheme, brings the two carriers (which are correlated) to the same level and then adds, resulting in output signal-to-noise-plus-interference ratio of $4C_1/[(N_1+I_1)+\alpha^2(N_2+I_2)]$, where $\alpha^2$ is the adaptive filter that equalizes the two carrier powers, i.e., $C_2=\alpha^2 C_1$. Suppose we weight the adaptive signal output by $\beta$. Then the resulting signal-to-noise-plus-interference ratio is $(1+\beta)^2 C_1/[(N_1+I_1)+\beta^2\alpha^2(N_2+I_2)]$. Maximizing this ratio with respect to $\beta \Rightarrow 2(1+\beta)C_1[(N_1+I_1)+\beta^2\alpha^2(N_2+I_2)]-2\beta\alpha^2(N_2+I_2)(1+\beta)^2 C_1=0$, or $\beta_{opt}=(N_1+I_1)/[\alpha^2(N_2+I_2)]$. With equal noise-plus-interference, i.e., $(N_1+I_1)=(N_2+I_2)$, $\beta_{opt}=1/\alpha^2$ (i.e., undo the adaptive gain). This is referred to as maximum ratio receiver combining (MRRC). To generalize this to M signals, optimize in pairs (where one of the signals is new and the other is the M−1 signal MRRC output). This can be repeated recursively (i.e., define M−1 MRRC in terms of a new signal and M−2 MRRC and so on until M=1).

Figure 3:
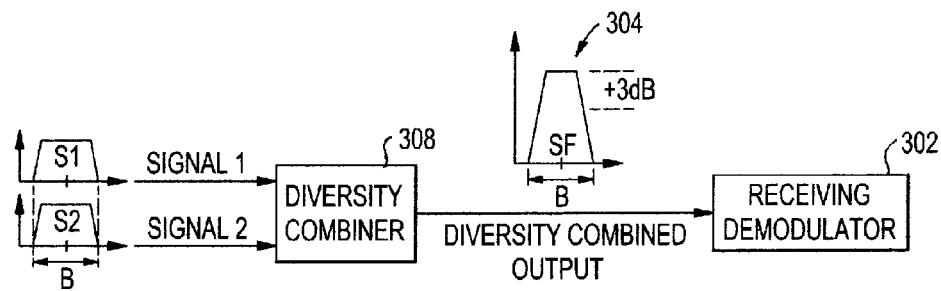
FIGS. 3-5 are block diagrams depicting the diversity combiner used for two or more signals.
Figure 4:
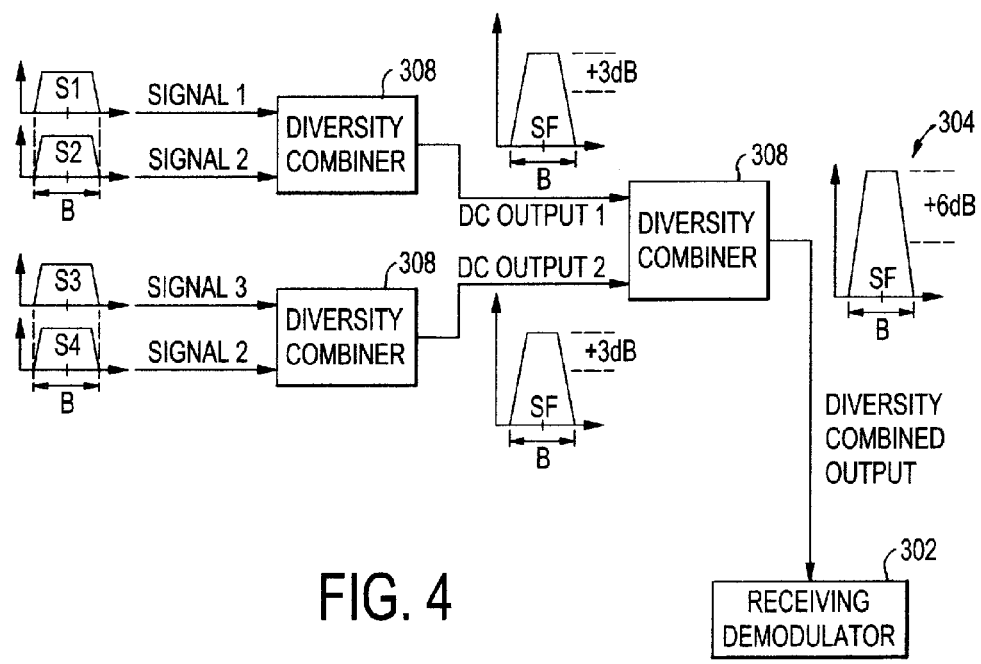
Figure 5:
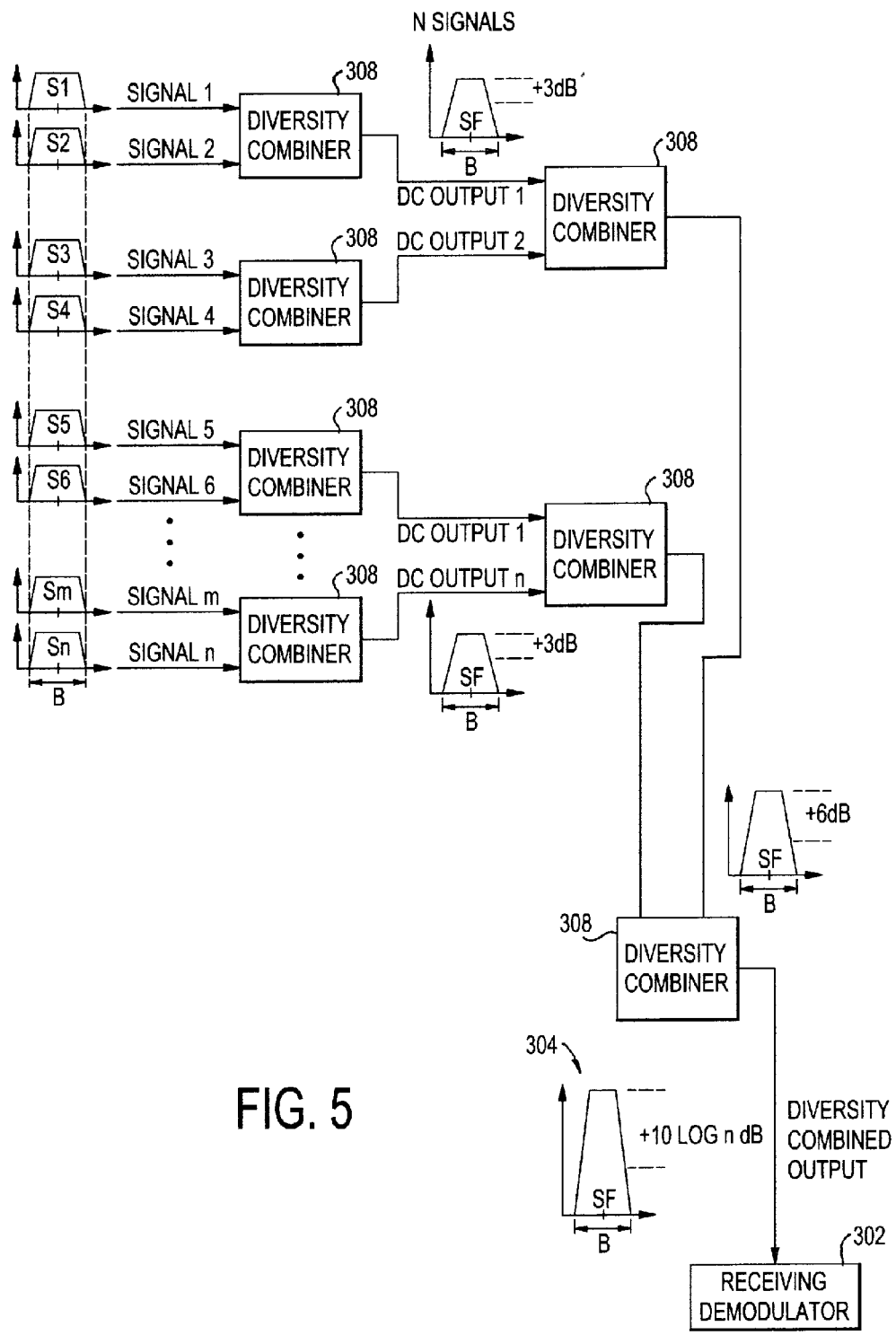

Referring to FIGS. 3-5, the diversity combiner 308 can be configured to operate with any number of input signals 310. When the system 5 is utilized for communicating two signals 310, a single diversity combiner 308 is provided, as shown in FIG. 3. The diversity combiner 308 receives the two diverse signals 310 (which are labeled as Signal 1 and Signal 2 in FIGS. 1 and 3-5), and aligns those signals 310, then coherently frequency and phase combines those signals 310 (Signal 1 and Signal 2) to provide the diversity combined signal 304 as a frequency and phase combined output. As shown, the diversity combined signal 304 has an increased signal-to-noise of 3 dB with respect to the input Signal 1 and Signal 2, while having the same bandwidth B as Signals 1 and 2. Coherent summation of the two signals increases power by 6 dB, but incoherent increase in noise and interference terms increases them by 3 dB; ideally, signal-to-noise ratio can improve by 3 dB, but this can reduce, depending on actual system phase noise and step-size, it used, to value in the range 2.5 dB-3 dB.

In FIG. 4, three diversity combiners 308a, 308b, 308c are provided in a cascaded configuration to process four signals. The diversity combiners 308 are provided in two stages. In the first stage, two diversity combiners 308a, b are utilized, with the first diversity combiner 308a receiving Signal 1 and Signal 2, and the second diversity combiner 308b receiving Signal 3 and Signal 4. Each of the diversity combiners 308a, 308b increase the power level of the signal (3 dB in the embodiment shown). The output of the first stage signals are passed to the diversity combiner 308c in the second stage. Though the diversity combiners 308a, 308b, 308c are shown as separate elements, they can be combined into a single component. The signal-to-noise ratio improvement obtained by replicating twice is (ideally) 3 dB (FIG. 4), while that for replicating the signal 4 times is (ideally) 6 dB. The actual signal-to-noise ratio improvement must account for any increase in PAPR (Peak-to-Average Power Ratio) and inter-modulation noise (which is dependent the Total Output Power Back-off (TOPB) of the transponder from full saturation, and the number of replicas).

As illustrated in FIG. 5, the system 5 can process any number n of signals. Preferably, but not limited, each diversity combiner 308 processes two signals at a time. Accordingly, for n signals, there are n−1 diversity combiners 308 (providing $3\times\log_2 n$-PAPR-inter-modulation noise increase dB of signal-to-noise ratio improvement). As can be seen from FIGS. 4-6, the greater the number of replicated signals 110 on the downlink signal 314, the greater the power on the diversity combined signal 304. And, the greater the power that can be obtained from the downlink signal 314, the smaller the aperture can be used for the antenna at the receiving station 316.

Figure 6:
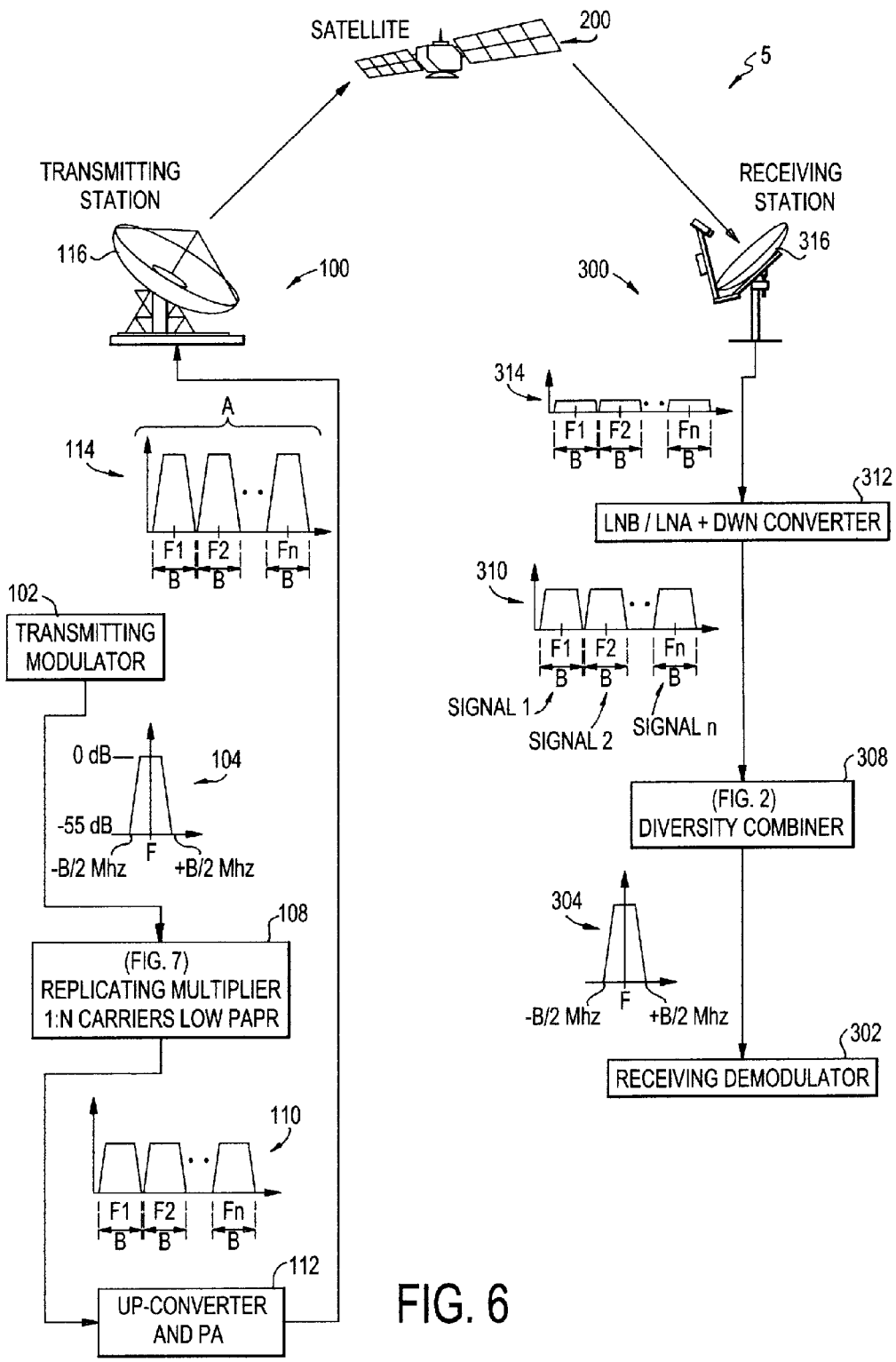
FIG. 6 is a block diagram of an alternative embodiment using one transponder of one satellite.

Turning to FIGS. 6-10, alternative preferred embodiments of the invention are shown. Referring momentarily back to FIG. 1, the system 5 preferably utilizes multiple transponders of a single satellite 200. However, as shown in FIG. 6, the system 5 can also be configured to utilize one transponder of a single satellite 200 when, for instance, an application calls for the use of a single transponder or when multiple transponders are not available. But, that means that additional carriers are needed to access the single transponder, which in turn increases the PAPR. For instance, a single carrier has a PAPR of 3 dB; two carriers signals on a single transponder have 3 dB; four carriers (at phases 0, 0.227π, 0.386π, and 1.05π, with slightly unequal I and Q amplitudes (by 0.05 dB)) have a PAPR of 2.02 dB; and eight carriers (with phases at 0, 0.25π, 0.02π, 0.81π, 0.69π, 0.93π and 0.75π, and I and Q amplitudes are equalized) have a PAPR of 1.21 dB. As the number of carriers, n, increases, signal distortion results in increased number of inter-modulation products $O(n^2/2)$ which generate inter-modulation noise (which also depend on TOPB of the transponder and PAPR). Thus, as a practical matter, the number of carriers is limited to no 2, 4 and 8 to avoid excessive inter-modulation products. In contrast, since the embodiment of FIG. 1 only has a single carrier for each transponder of the satellite 200, there are no inter-modulation product and therefore no need to be concerned with the PAPR (and with n transponders, the system gains $3\times\log_2 n$ dB in signal-to-noise-plus-interference).

By keeping the PAPR low in FIG. 6, the system 5 maximizes the available power on the satellite 200 by minimizing inter-modulation products generated in the case that multiple spectral replicas are transmitted using the same satellite transponder operating close to saturation. Inter-modulation products can occur by the satellite producing multiple downlink signals in the non-linear range of the uplink signal. Accordingly, it is important that the replicated signal 110 be as near to constant envelope as possible to minimize the negative effects of the inter-modulation products resulting at the downlink signal of the satellite 200.

In the present alternative preferred embodiment shown in FIG. 6, a power booster 110 is provided to replicate the signal 104. The replicated signal 110 is then sent to the up-converter 112, which processes the replicated signal 110 into a transmit signal 114 at higher frequencies F2, F3 . . . Fn. The PA amplifies the signal, so that the converted signal 114 has greater power with respect to the replicated signal 110. The replicated signal 110 (and thus the converted signal 114) is selected to be at frequencies which combined access one transponder of the satellite 200. As shown by label A in the embodiment of FIG. 1, the converted signal 114 has a combined bandwidth which is within the bandwidth and frequency of a single satellite 200 transponder (i.e., within 36 MHz or 72 MHz). The transmit or uplink signal 114 is then transmitted by the transmitting station 116 to the satellite 200.

Figure 7:
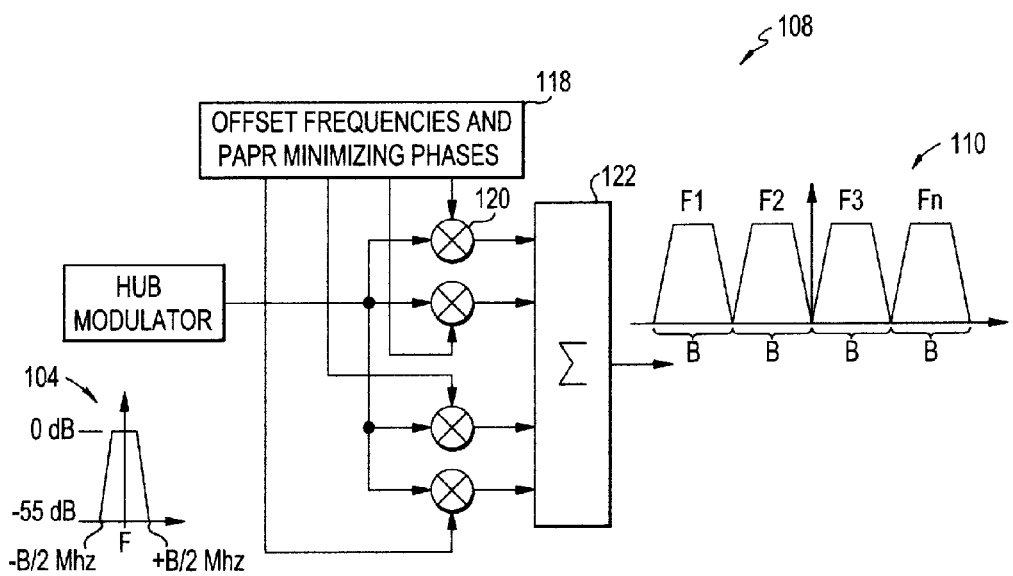
FIG. 7 is a block diagram of the power booster of FIG. 6.

FIG. 7 illustrates further details of the replicator or power booster 108 shown in FIG. 6. The power booster 108 receives an input signal 104 from the transmitting modulator 102 (FIG. 6) and generates a spectral replication of the signal 110. The signal is input into n (four in the embodiment of FIG. 2) multipliers 120, together with offset frequencies and PAPR minimizing phases 118. The multipliers 120 then each provide as an output, the input signal 104 at different frequencies, F1, F2 . . . Fn. The combiner 122 combines those outputs into a single replicated signal 110. As shown, each of the replicated signals 110 has the same bandwidth B and amplitude as the original input signal 104, but are at different frequencies F2 . . . F5.

Returning to FIG. 6, the replicated signal 110 has multiple copies of the received modulated signal 104. Each of the signals carries the same information over the same bandwidth as the modulated signal 104, but at different frequencies. The power booster 108 minimally degrades the PAPR of the modulated signal 104 when generating the replicated signal 110. Accordingly, the replicated signal 110 has a low PAPR. For instance, with 4 replicated signals, the PAPR increase is 2.06 dB, and with 8 replicated signals the PAPR is increased by 1.6 dB compared to a single carrier signal. If n signals are combined, without selecting phases that minimize PAPR, then the PAPR can be as much as $\sqrt{n}$ (i.e., 9 dB for 8 replicated signals).

Figure 8:
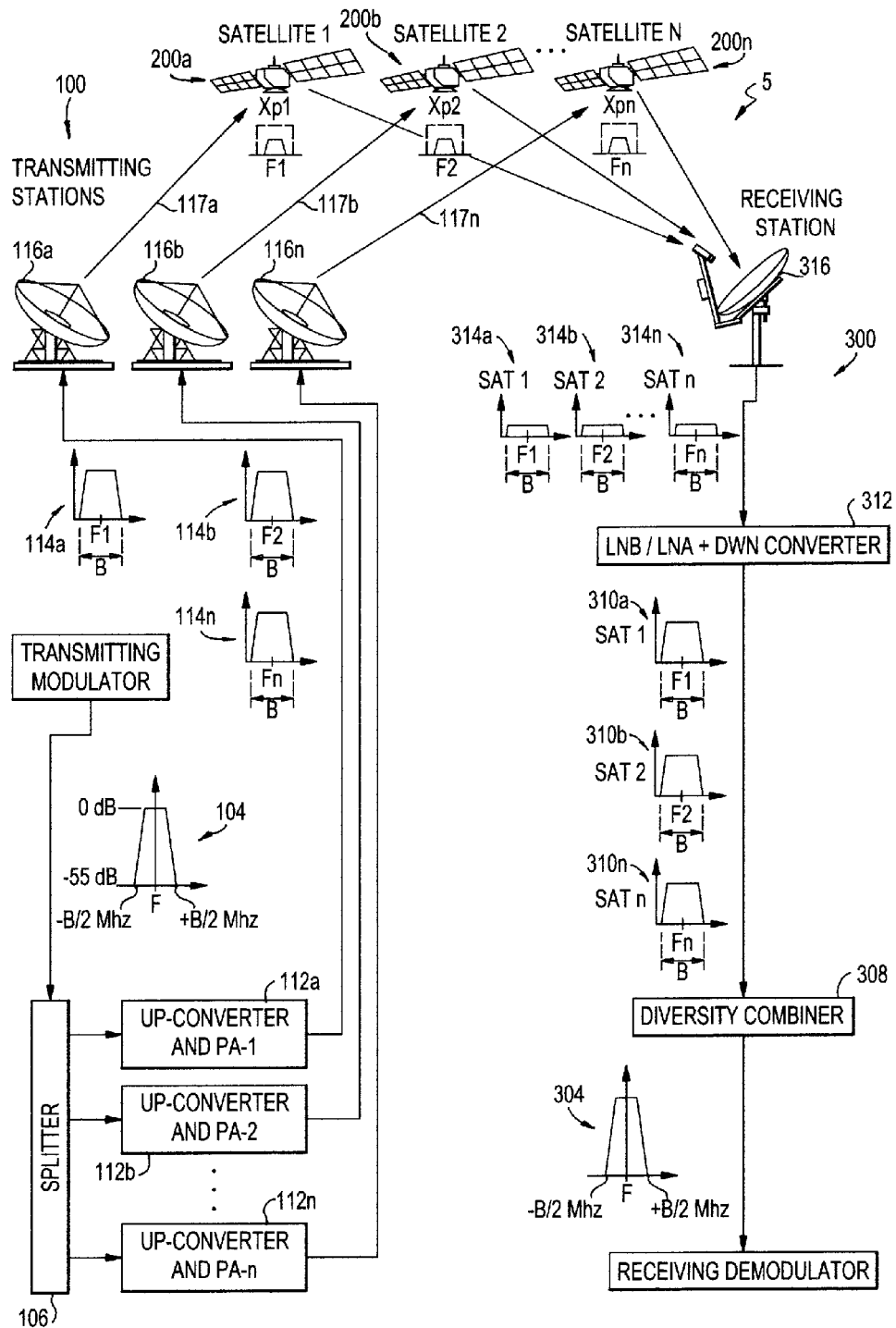
FIG. 8 is a block diagram in accordance with alternative embodiment of the invention using one transponder from each of multiple satellites.

FIG. 8 shows the system 5 in yet another alternative preferred embodiment utilizing one transponder for each of multiple satellites 200 (thus, a low PAPR need not be maintained). In this embodiment, a separate antenna is provided at the transmitting station 116 for each of the satellites 200a, 200b, 200n, and each antenna transmits a signal 114 over a single transponder of the respective satellite 200. There can be one transmitting station with multiple antennas, or multiple transmitting stations each having one antenna which are remote from each other. The splitter 106 separates the signal to individual up-converter and PA devices 112a, 112b, 112n, which generate the up-converted and amplified signals 114a, 114b, 114n having increased power (3 dB in the embodiment shown) over the modulated signal 104, respectively. The up-converted signals 114a, 114b, 114n are transmitted to the satellites 200a, 200b, 200n, as uplink signals 117a, 117b, 117n via transmit station antennas 116a, 116b, 116n, respectively. The satellites 200a, 200b, 200n then retransmit the uplink signals 117a, 117b, 117n as downlink signals 201a, 201b, 201n, respectively.

Figure 9:
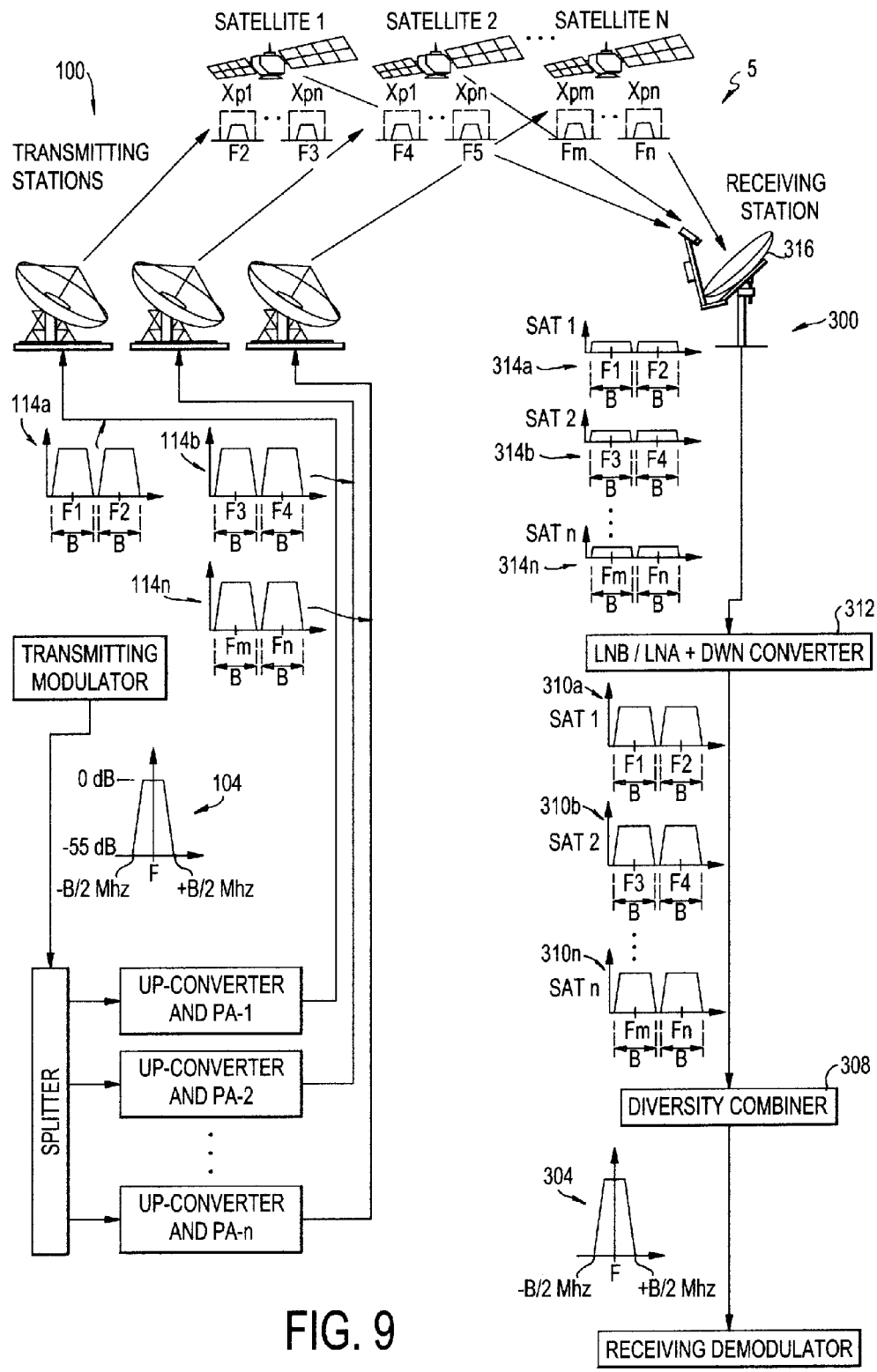
FIG. 9 is a block diagram in accordance with another alternative embodiment of the invention using two transponders from each of multiple satellites.

At the remote terminal 300, the antenna at the receiving station 316 separately receives each of the downlink signals 201a, 201b, 201n from the respective satellites 200a, 200b, 200n, at the respective frequency carriers on which the converted signals 114a, 114b, 114n were generated. The receiving station 316 passes each of the received signals 314a, 314b, 314n to the LNB/LNA down-converter 312, which sends amplified converted signals 310a, 310b, 310n to the diversity combiner 308. The diversity combiner 308 generates a boosted signal 304 having increased power for each of the converted signals 310a, 310b, 310n. The combination of multi-carrier PAPR minimization and coherent frequency and phase combining with single transponder has benefits when the antenna aperture at the receiving station 316 has insufficient gain, or receives significant ASI, or both. This is because the signal is boosted relative to noise and interference components (as described before). FIG. 9 shows another embodiment of the invention, where the system 5 using multiple transponders and multiple satellites 200.

Figure 10:
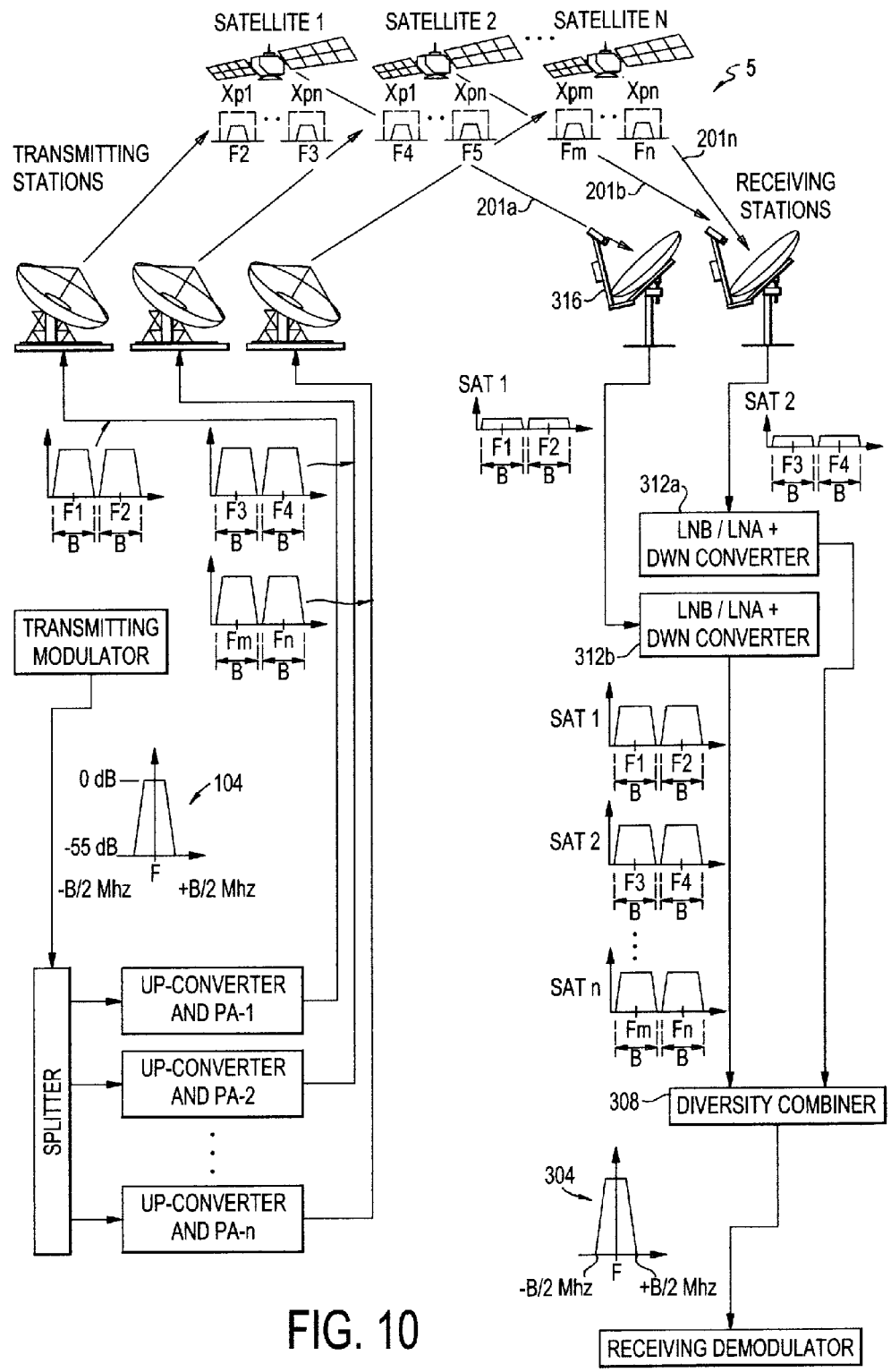
FIG. 10 is a block diagram in accordance with another alternative embodiment of the invention using a single transponder from each of multiple satellites and having multiple receiving antennas.

FIG. 10 shows the system 5 using multiple satellites 200a, 200b, 200n with multiple antennas at the receiving station 316. Each antenna may receive one or more of the downlink signals 201a, 201b, 201n. In the embodiment shown, a first antenna at the receiving station 316 receives the first downlink signal 201a, and a second antenna at the receiving station 316 receives the other downlink signals 201b, 201n. Accordingly, a separate LNB/LNA down-converter 312a, 312b is provided for each of the antennas. It is noted that the diversity combiner 308 can process the signals from the various satellites in any order. For instance, a first stage of diversity combiners 308 can combine the two signals from Sat 1 and the two signals from Sat 2, then a second stage can combine those combined signals. Alternatively, a first diversity combiner 308 can combine the first signal of Sat 1 with the first signal of Sat 2, a second diversity combiner 308 can combine the second signal of Sat 1 with the second signal of Sat 2, and a third diversity combiner 308 can combine the results form the first and second diversity combiners 308.

FIGS. 6-10 show different embodiments of the invention. All of those figures provide replicated signals which are used to maximize the power obtained from the respective satellite(s). Regardless of whether one or multiple transponders, transmitting antennas, satellites, or receiving antennas are used, a signal 310 is obtained which is then power boosted. The power boosted signal 304 enables a small aperture or ultra small aperture receiving antenna 316 to be used, while maintaining gain, and without having to increase the power at the satellite. Replication increases the transmit power (by 3 dB), whereas the diversity combining increases the signal component by as much as 6 dB (for two equal amplitude inputs), and also increases noise and interference by 3 dB. This system improves the link margin when there is inadequate EIRP, without actually increasing EIRP.

In the embodiments shown, the operation of the modulator 102, power booster 108, and up-converter 112 or 109, splitter 106, HPA 113, as well as the operations of the demodulator 302, diversity combiner 308, and the down-converter 312, are preferably implemented by any suitable computing processor or processing platform which is capable of performing the functions and operations in accordance with the invention. The computing platform is preferably, for instance, a FPGA (Field programmable Gate array) or an ASIC (Application-Specific Integrated Circuit). In particular, the power booster 108 and the diversity combiner 308 are implemented by a FPGA or ASIC device, either in a stand alone system or fully integrated with the modulator 102 or demodulator 302. All or parts of the system and processes can be stored on or read from a memory or computer readable media. The modulator 102 and demodulator 302 are preferably standard off the shelf equipment.

To illustrate the foregoing with a practical example, let us consider a 80 cm C-band antenna. For a satellite EIRP of 39 dBW, even at the lowest rate DVB-S2 option (QPSK, i.e., Quadrature Phase-Shift Keying, code rate-1/4), signal power is insufficient to overcome noise and interference. Instead, in accordance with present teachings, we configure two DVB-S2 modulators at hub (modulation and M/N coding to be determined after calculating the diversity-combined signal-to-noise plus interference ratio) with identical data, on two transponders on the same satellite on the uplink. Receiver diversity combines the two transponder signals (gaining ~2.5 dB on both ASI and Carrier-to-Noise (C/N) ratio ~2.7 dB with 2 dB fade/scintillation margin). Assuming C/(N+1)=2 dB, and a DVB-S2 QPSK 2/5 is selected, i.e., the undetermined modulation is established to be QPSK and coding is established to be rate 2/5 LDPC. Thus, at the additional cost of tuner and diversity combiner at the remote, the present invention has enabled a 0.4 bps/Hz channel. The system has increased total satellite power by 3 dB (because of use of the original power on each of the two transponders) and increased bandwidth, but has enabled a channel at a net rate not possible using a single (non-replicated) channel using available DVB-S2 modulations.

Coherent frequency and phase combining of multiple spectral replicas allows boosted receiver power output. Replication can use multiple transponders or spread information to multiple sub-carriers within a transponder (while minimizing PAPR).

The combination of power boosting, coherent frequency combining and using one or multiple transponders (or frequencies or satellites or other similar means for replication) has benefits when the antenna aperture of the antenna at the receiving station 316 has insufficient gain (such as for small and ultra small aperture antennas), encounters significant ASI, or both. The power booster 108 or splitter 106 boosts the power, which improves the signal-to-noise ratio at the diversity combiner 308. In the example cited above, PAPR minimized spectral replication is not needed since one transponder data is replicated across many transponders. In this case, the same source data is fed to multiple modulators (and there is no need to adjust phasing of each modulator).

It should be noted that devices which are in communication with one another need not be in continuous communication with each other. And, devices which are in communication with each other may communicate directly or indirectly through one or more intermediaries.

In addition, the foregoing splitter 106, up-converter 109, HPA 113 and/or replicator 108 may be conveniently integrated within a modulator and the foregoing diversity combiner conveniently integrated into a demodulator of a (e.g., DVB-S2) modem.

The foregoing description and drawings should be considered as illustrative only of the principles of the invention. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

We claim:

1. A system for receiving a downlink signal having substantially identical replicated signals from a satellite, the system comprising:
    a receive antenna configured to receive the downlink signal; and
    a plurality of diversity combiners arranged in a cascading configuration, the plurality of diversity combiners configured to coherently combine the replicated signals by phase and frequency to provide a diversity combined signal.

2. The system of claim 1, wherein said system comprises a modem.

3. The system of claim 1, further comprising an amplifier configured to receive the downlink signal from said receive antenna and amplifying the downlink signal to provide an amplified signal.

4. A method for receiving a downlink signal having substantially identical replicated signals from a satellite, the method comprising:
    receiving the downlink signal over a receive antenna; and
    coherently combining by a plurality of diversity combiners arranged in a cascading configuration, the replicated signals by phase and frequency to provide a diversity combined signal.

5. The method of claim 4, wherein the step of receiving comprises receiving one of the replicated signals at each of a plurality of receive antennas.

6. The method of claim 4, further comprising amplifying the downlink signal using an amplifier to provide an amplified signal.

7. A method for receiving a downlink signal having substantially identical replicated signals from a satellite, the method comprising:
    receiving the downlink signal at a plurality of receivers; and
    coherently combining by a plurality of diversity combiners arranged in a cascading configuration, the downlink signal received at each of the plurality of receivers by phase and frequency to provide a diversity combined signal.

8. The method of claim 7, further comprising amplifying the downlink signal using an amplifier to provide an amplified signal.

9. A system for receiving a downlink signal having substantially identical replicated signals from a satellite, the system comprising:
    a plurality of receivers each configured to receive the downlink signal; and
    a plurality of diversity combiners arranged in a cascading configuration and configured to receive the downlink signal from said plurality of receivers and coherently combine the replicated signals by phase and frequency to provide a diversity combined signal.

10. The system of claim 9, further comprising an amplifier configured to amplify the downlink signal to provide an amplified signal.

* * * * *